(12) United States Patent
Vogler et al.

(10) Patent No.: US 7,201,058 B2
(45) Date of Patent: Apr. 10, 2007

(54) PRESSURE TRANSMITTER AND A METHOD OF MAKING A PRESSURE TRANSMITTER FROM A SENSOR UNIT AND A BODY PART

(75) Inventors: Jes Vogler, Sydals (DK); Erling Thomsen, Nordborg (DK)

(73) Assignee: Danfoss A/S, Nordborg (DK)

( * ) Notice: Subject to any disclaimer, the term of this patent is extended or adjusted under 35 U.S.C. 154(b) by 33 days.

(21) Appl. No.: 11/044,963

(22) Filed: Jan. 27, 2005

(65) Prior Publication Data

US 2005/0189428 A1 Sep. 1, 2005

(30) Foreign Application Priority Data

Jan. 30, 2004 (DK) ................ 2004 00141

(51) Int. Cl.
*G01L 7/00* (2006.01)
(52) U.S. Cl. ...................................... 73/756
(58) Field of Classification Search ............... 73/718, 73/724, 756, 708
See application file for complete search history.

(56) References Cited

U.S. PATENT DOCUMENTS

| | | | |
|---|---|---|---|
| 4,006,640 A | 2/1977 | Gealt | 73/393 |
| 5,691,479 A | 11/1997 | Krisch et al. | 73/756 |
| 6,122,154 A | 9/2000 | Damerow et al. | 361/32 |
| 6,639,502 B2 | 10/2003 | Herrick | 337/102 |
| 6,647,794 B1 * | 11/2003 | Nelson et al. | 73/718 |
| 6,983,650 B2 * | 1/2006 | Katou et al. | 73/146 |
| 7,036,381 B2 * | 5/2006 | Broden et al. | 73/708 |

FOREIGN PATENT DOCUMENTS

| | | |
|---|---|---|
| EP | 0 420 569 A2 | 9/1990 |
| JP | 8189871 | 7/1996 |

* cited by examiner

*Primary Examiner*—Jewel Thompson
(74) *Attorney, Agent, or Firm*—McCormick, Paulding & Huber LLP

(57) ABSTRACT

A pressure transmitter includes a body part and a sensor unit which are joined hermetically. Adjacent to the hermetic joint, there is a gap between adjacent surfaces of the body and sensor unit, which gap facilitates an easier assembling procedure and which facilitates transportation of gases away from the hermetic joint zone when the body and sensor unit is assembled e.g. by welding.

15 Claims, 5 Drawing Sheets

PRESSURE TRANSMITTER AND A METHOD OF MAKING A PRESSURE TRANSMITTER FROM A SENSOR UNIT AND A BODY PART

CROSS-REFERENCE TO RELATED APPLICATIONS

This application is entitled to the benefit of and incorporates by reference essential subject matter disclosed in Danish Patent Application No. PA 2004 00141 filed on Jan. 30, 2004.

FIELD OF THE INVENTION

The present invention relates to a pressure transmitter for measuring the pressure of a system.

BACKGROUND OF THE INVENTION

Transmitters are often used in pressure systems which conduct a fluid flow, e.g. in vacuum systems or in refrigeration systems.

Normally, the transmitters comprise a connection piece, for example with a screw threaded part or a welding flange for attachment to the pressure system. The connection piece typically forms part of a fluid communication conduit from the pressure system to a pressure sensor unit which is assembled hermetically with the connection piece. Normally, the sensor unit is inserted into the conduit to form a closure thereof, and subsequently it is fastened hermetically to the connection piece by welding. The transmitter may further have various electronic components for transforming the sensed pressure into a standardized electric signal.

In the known transmitters, the connection piece comprises a cylindrical cavity with a circular cross-sectional shape and with an exactly fixed radial size in its full depth. The sensor, correspondingly, has the shape of a piston of a dimension fitting into the cylindrical cavity. During the manufacturing of the transmitter, the sensor unit is pressed into the cavity and subsequently, the connection piece and the sensor unit is welded together from the outside. In order to establish a temporarily fixed connection to maintain the sensor unit in a fixed position in the connection piece during welding, the dimensions of the sensor unit and the cavity are very close to each other to form an interference fit, and the sensor unit therefore has to be pressed into the cavity by use of force. This complicates the assembling work and requires narrow tolerances and thus more expensive components. Moreover, it has been found that gases caused by the welding process can be confined in the material and potentially lead to leakage between the connection piece and the sensor. The confining of the gases is intensified by the interference fit between the connection piece and the sensor.

SUMMARY OF THE INVENTION

It is an object of the invention to provide an improved pressure transmitter. Accordingly, the invention, in a first aspect, provides a pressure transmitter provided with a body part forming a cavity, and a pressure sensor unit arranged in the cavity such that the body and the sensor unit form in combination an assembling zone comprising a hermetic joint zone wherein the surfaces are joined hermetically, wherein the assembling zone further comprises a gap zone adjacent the hermetic joint zone in which gap zone the sensor unit and body are mutually dimensioned to form a gap between adjacent surfaces of the sensor unit and the body. Since the parts are dimensioned to form a gap adjacent the hermetic joint zone, gases, e.g. from a welding or gluing process will be allowed to drain away, and the risk of getting welding pores from confined gases or the risk of getting large hardening durations for a gluing process is reduced. Accordingly, the pressure transmitter may be improved.

The sensor unit may be of the kind generally known for measuring pressure, i.e. of the kind having a cavity with a bottom portion and a sidewall extending upwardly towards an opening which is sealed with a flexible membrane, the cavity of the sensor unit is typically filled with a liquid pressure transferring oil, and the cavity further houses a pressure sensitive electronic component.

The body may form a connection piece for connecting the pressure transmitter to a pressure system, e.g. via screw threads or via a welding flange, and may further house electronic components or have fixation means for fixating electronic components to the pressure transmitter. Such electronic components may be used for transforming the sensed pressure into a standardized electric signal.

The gap may preferably be in the size of up to 0.1 mm., such as in the size of 0.04 mm. The adjacent surfaces are the surfaces of the sensor unit and the body parts which are adjacent when the sensor unit is arranged in the body. Prior to the hermetic joining, e.g. by welding, the adjacent surfaces are the surfaces of the sensor unit and the body in the entire assembling zone. After the hermetic joining, the adjacent surfaces are possibly only the surfaces of the sensor unit and the body in the gap zone since the two components may be melted together in the remaining parts of the assembling zone.

The gap may be defined by at least one of the sensor unit and the body having a recessed or elevated surface part to form the gap between the sensor unit and the body when the sensor unit and the body are finally joined hermetically.

The body part could e.g. be a connection piece, e.g. with screw threads or with a welding flange for attachment to a pressure system. The cavity in the body part may form part of a through going conduit extending from the pressure sensor to the point wherein the body is attached to the pressure system. The pressure sensor unit is inserted into, and hermetically fastened to the cavity to form a closure thereof.

The assembling zone may further comprise a surface contact zone wherein the sensor unit and body are mutually dimensioned to form contact between adjacent surfaces when the sensor unit is arranged in the cavity, and prior to the hermetic joining. The contact zone facilitates easy assembling of the parts. During the assembling, the sensor unit is inserted into the cavity and pressed down therein until a required position of the sensor unit in relation to the body is reached. At this point, the adjacent surfaces engage each other in the contact zone and thus establish a preliminary fixation of the two parts, which preliminary fixation may facilitate final assembling by welding. The contact zone may e.g. have a length corresponding to between ⅙ and ½ of the length of the assembling zone, i.e. the sensor unit and body may form an interference fit over approximately ⅙ to ½ of the total length of hermetic joint zone, i.e. e.g. the length of the welding. The actual size depends on the required strength of the joint between the sensor unit and the body. The sensor unit gets more solidly attached to the body the longer the hermetic joint zone is. Adjacent the surface contact zone, it may be an advantage to have a gap in the size of up to 0.1 mm. During assembling by welding, a gap of this size on one hand facilitates transportation of gases away from the hermetic joint zone, and on the other hand allows the use of a welding process to join the sensor unit and the body across the gap. Outside the hermetic joint zone the gap may exceed the 0.1 mm.

The assembling zone may further comprise a transition zone extending between the surface contact zone and the gap zone. In the transition zone, the sensor unit and body are mutually dimensioned to form a gap of a size which varies along a path from the contact zone towards the gap zone. Adjacent the contact zone, the gap could equal 0 mm or closely equal zero mm and adjacent the gap zone, the gap could equal, or closely equal the gap which is found in the gap zone, e.g. varying from 0 mm towards 0.02–0.12 mm The gap may vary linearly, i.e. with a fixed increase for a fixed step along the path from the surface contact zone towards the gap zone. The transition zone may preferably be formed between smoothly inclined adjacent surfaces of the sensor unit and the body or by an inclined surface of at least one of the sensor unit and the body. Due to the transition zone, the sensor unit is wedged into sealing contact with the body part while the sensor unit is pressed down into the cavity, and the necessity of narrow tolerances between the sensor unit and the body part is therefore reduced. The transition zone may be formed by a surface of at lease one of the sensor unit and the body, said surface forming an angle to an adjacent surface portion of the other one of the sensor unit and the body when the sensor unit is arranged in the cavity. The angle may be of a size which ensures that the corresponding gap between the surfaces is in the size of up to 0.1 mm. The transition zone may thus define a wedge-shaped gap which gap further enhances draining of the gases away from the assembling zone, and thus further reduces the risk of getting welding pores from confined gases. During the final hermetic assembling process, e.g. by welding or gluing, at least a part of the gap in the transition zone may be eliminated by the melt or glue deriving from the final assembling process.

The body and/or the sensor unit may preferably be made from any metallic material and preferably be assembled by WIG (Wolfram Inert Gas) welding.

Preferably, the cavity is cylindrical and the sensor unit has the shape of a piston. In this situation, the adjacent surfaces are constituted by the peripheral inner and outer surfaces of the cylinder and piston, respectively. In order to provide a transition zone with a wedge-shaped gap between the contact surfaces, the contact surface of at least one of the sensor unit and the body may have at least two surface sections forming an angle to each other.

In a preferred embodiment of the invention, the cavity of the body form part of a conduit from a first end to an opposite second end of the body part. If the body forms a connection piece for connecting the transmitter to a pressure system, e.g. a refrigeration system, the first end could have fastening means, e.g. screw threads or a welding flange for connecting the body to a pressure system. The cavity and the contact surfaces have circular shapes in a cross section perpendicular to the conduit, and in order to provide a hermetic sealing connection between the sensor unit and body, the sensor unit may be attached to the body part by welding and hereafter forms a closure which seals the second end of the conduit.

In a second aspect, the invention provides a pressure sensor unit for a pressure transmitter, said sensor unit comprising a cavity with a bottom portion and a sidewall extending upwardly towards an opening which is sealed with a flexible membrane, wherein an outer surface of the sidewall forms an assembling surface which, during a final assembling step, is assembled with a corresponding assembling surface of an associated pressure transmitter body part, characterised in that the assembling surface comprises at least two non-parallel surface portions, i.e. wherein the surface portions form an angle $\alpha$ to each other over a section of the assembling area, wherein $0<\alpha<90$ degrees, or preferably $0<\alpha<3$ degrees, such as $\alpha=2.3$ degrees, or so that the angle between the surfaces provides a gap between the surfaces in the size of up to 0.1 mm.

In a third aspect, the invention provides a body part for a transmitter, said body part forming a cavity having an opening for receiving a pressure sensor, and in the cavity, an assembly surface which, during a final assembling step, is assembled with a corresponding assembling surface of an associated sensor, characterised in that the assembling surface comprises at least two non-parallel surface portions, i.e. wherein the surface portions form an angle $\alpha$ to each other over a section of the assembling area, wherein $0<\alpha<90$ degrees, or preferably $0<\alpha<3$ degrees, such as $\alpha=2.3$ degrees, or so that the angle provides a gap between the sensor unit and the body which gap is in the size of up to 0.1 mm.

In a fourth aspect, the invention provides an assembly kit for making a pressure transmitter, said kit comprising: a pressure sensor unit comprising a cavity with a bottom portion and a sidewall extending upwardly towards an opening which is sealed with a flexible membrane, wherein an outer surface of the sidewall forms an assembling surface which during a final assembling step is assembled with a corresponding assembling surface of an associated pressure transmitter body part, and a body part forming a cavity having an opening for receiving the pressure sensor, and in the cavity, an assembly surface which during a final assembling step is assembled with the assembling surface of the sensor, characterised in that the sensor unit and body are mutually dimensioned to form a gap between at least a part of the assembling surfaces when the sensor unit is arranged in the cavity for hermetic assembling. I.e. a part of the surfaces which are joined, e.g. by melt during a welding process, form a gap therein between.

Any feature described with relation to the first aspect of the invention may be combined with the second, third or fourth aspect of the invention.

BRIEF DESCRIPTION OF THE DRAWINGS

In the following, the invention will be described in further details with reference to the drawing in which.

DETAILED DESCRIPTION OF THE PREFERRED EMBODIMENTS

Figure 1:
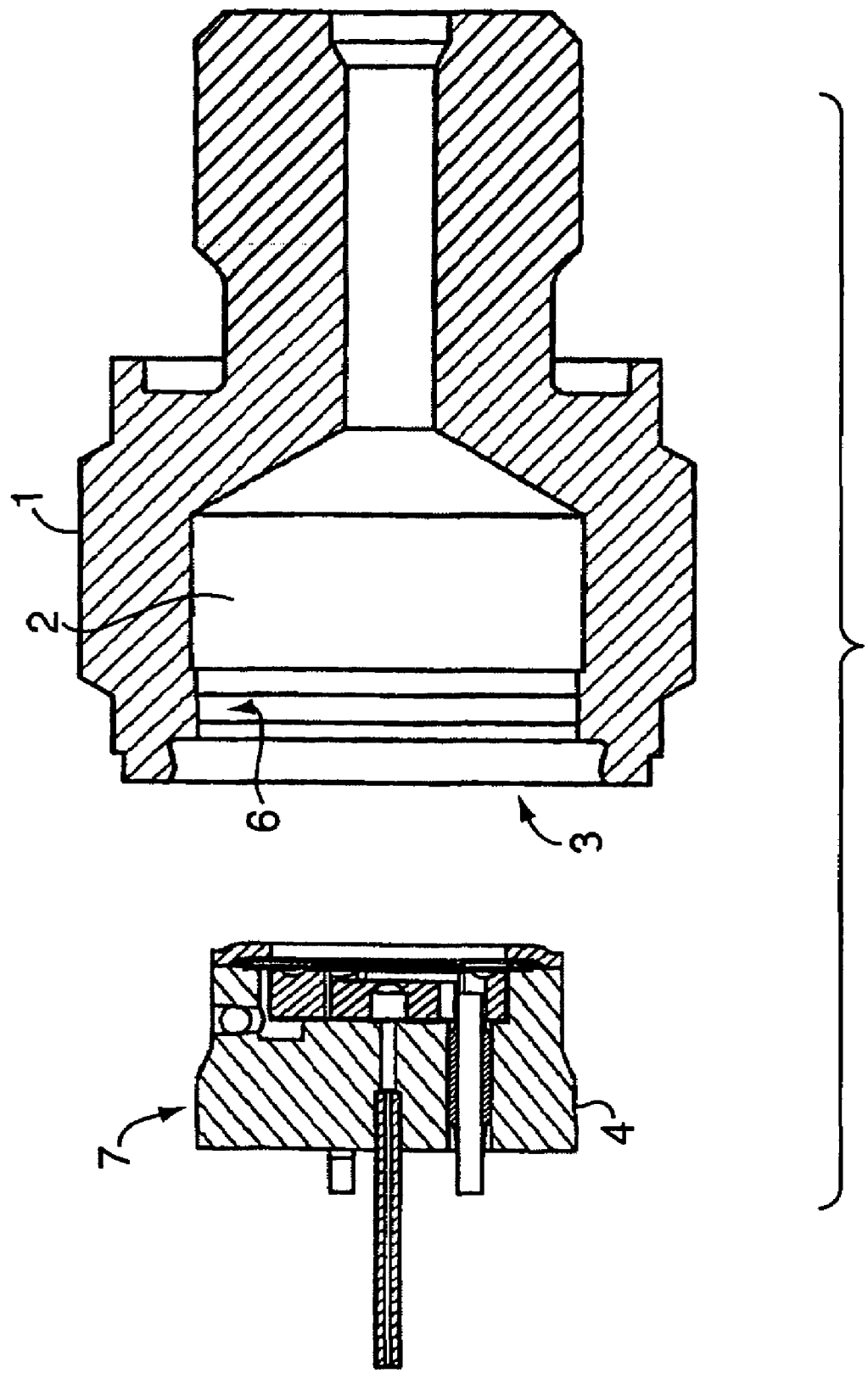
FIG. 1 is a cross-sectional view of the pressure transmitter in an exploded view.
Figure 2:
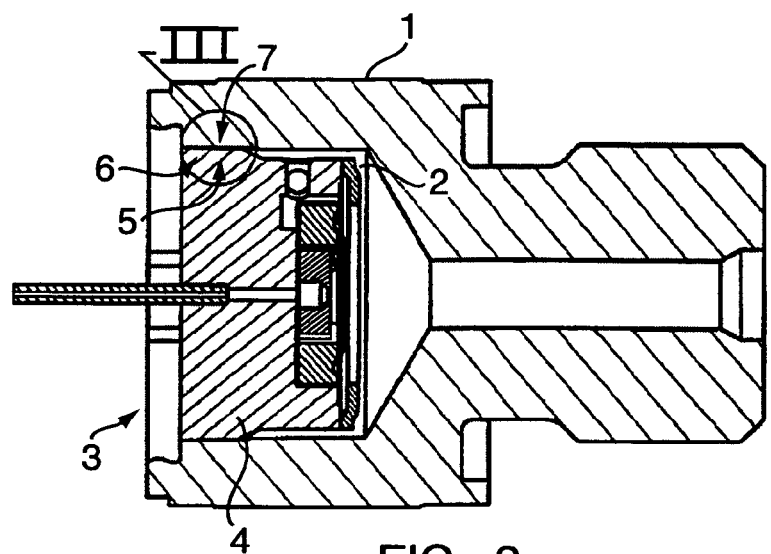
FIG. 2 is a view of the pressure transmitter in FIG. 1 in an assembled view.
Figure 3:
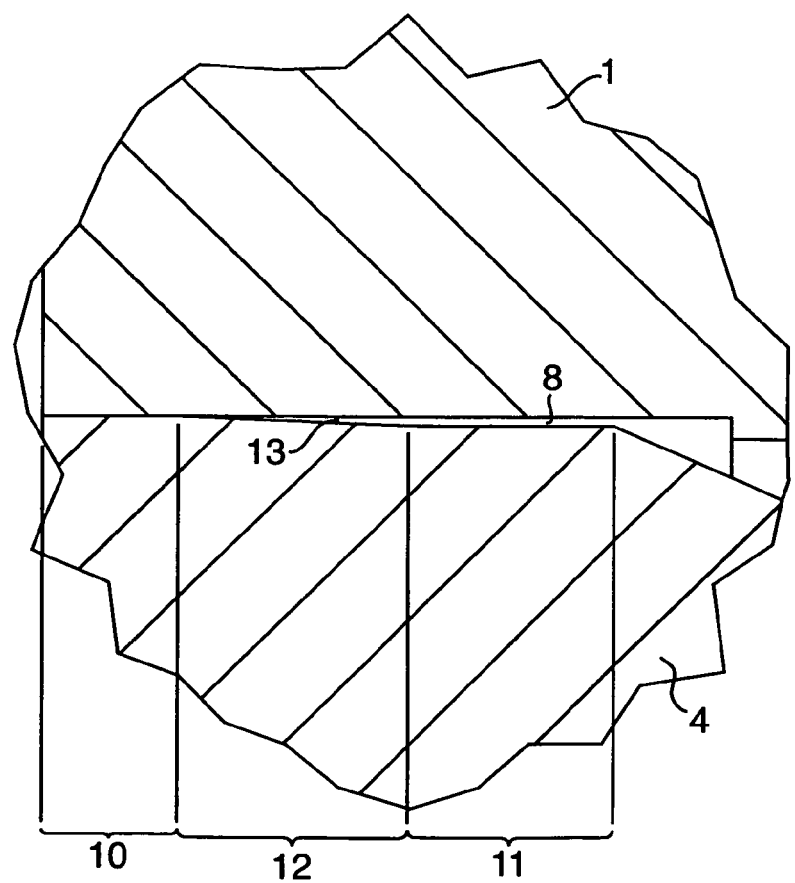
FIG. 3 is an enlarged view of the assembling zone of the pressure transmitter.

FIG. 1 shows a pressure transmitter with a body part 1 forming a cavity 2 having an opening 3 for receiving a pressure sensor unit 4. In FIG. 2, the pressure sensor unit is arranged in the cavity ready to be finally hermetically assembled in the assembling zone 5 via adjacent surfaces 6, 7 (in FIG. 1) of the body 1 and the sensor unit 4. As best seen in the enlarged view of FIG. 3, the sensor unit 4 and body 1 are mutually dimensioned to form a gap 8 in the assembling zone when the sensor unit is arranged in the cavity. In FIG. 3, the parts are not yet assembled hermetically. The assembling zone comprises a surface contact zone 10 wherein the sensor unit 4 and body 1 are mutually dimensioned to form contact between the adjacent surfaces while they are being assembled, a gap zone 11 wherein the sensor unit and body are mutually dimensioned to form a gap in the size of 0.1 mm between the adjacent surfaces, and a transition zone 12. The surface contact zone supports manufacturing by fixating the sensor unit 4 preliminary in the body 1 until final assembling is conducted by welding, and the transition zone provides a wedge-shaped gap 13 between the sensor unit and the body. The size of the wedge-shaped gap varies from 0 to the size of the gap in the gap zone. In the transition zone, at least one of the sensor unit and the body has a surface forming an angle to an adjacent surface of the other one of the sensor unit and body. The angled portion of the adjacent surface of the sensor unit and/or the body is shown in further details in FIGS. 4 and 5 and in FIGS. 6 and 7.

Figure 4:
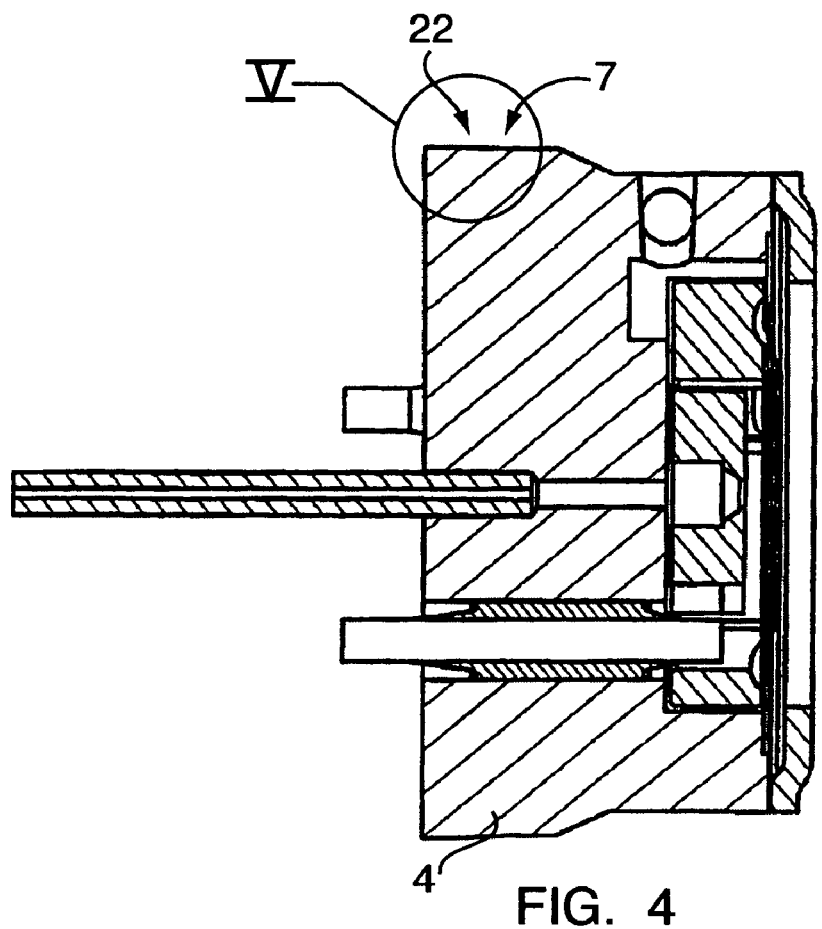
FIG. 4 is a view of the pressure sensor unit for the pressure transmitter.
Figure 5:
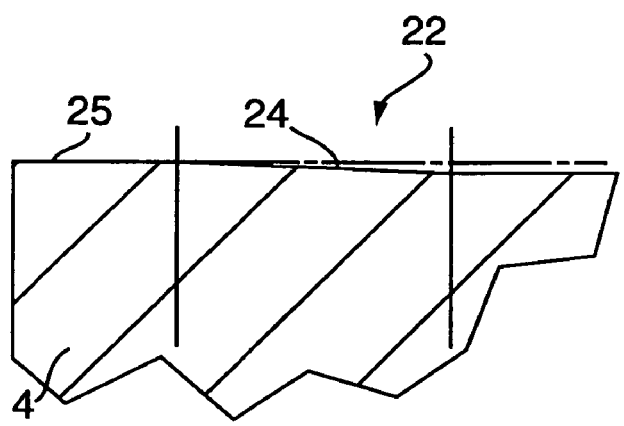
FIG. 5 is an enlarged view of an assembly surface of the pressure sensor unit in FIG. 4.

In FIG. 4, the sensor unit 4 is shown isolated from the body 1, and in FIG. 5, an enlarged view of the encircled part V showing the surface 22 of the sensor unit is shown. The surface 22 comprises surface portion 24 having an inclination of 2.3 degree to the surface portion 25. When the sensor unit 4 is arranged in the body 1, a wedge-shaped gap is formed between the surface portion 24 and an adjacent surface portion of the body 1.

Figure 6:
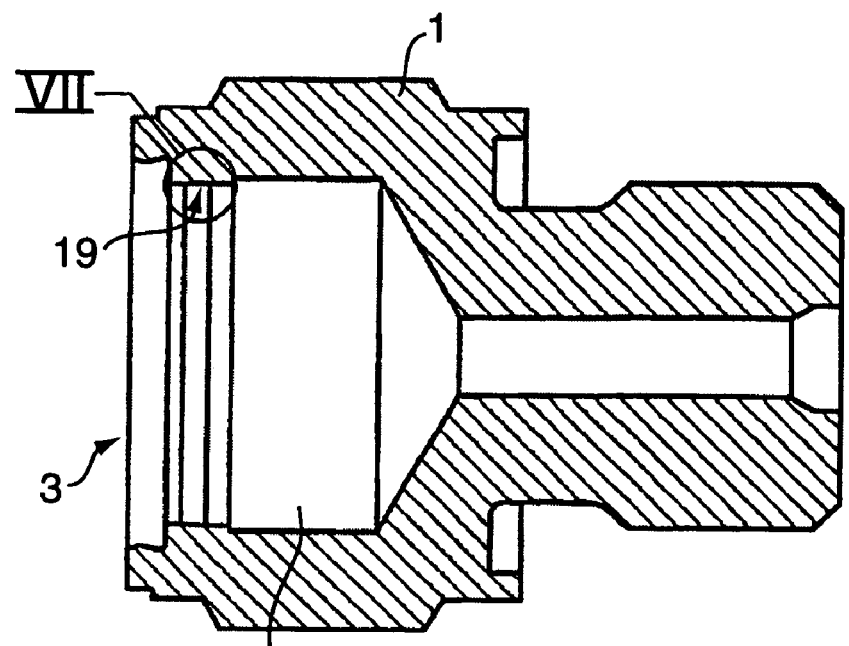
FIG. 6 is view of a body part for the pressure transmitter.
Figure 7:
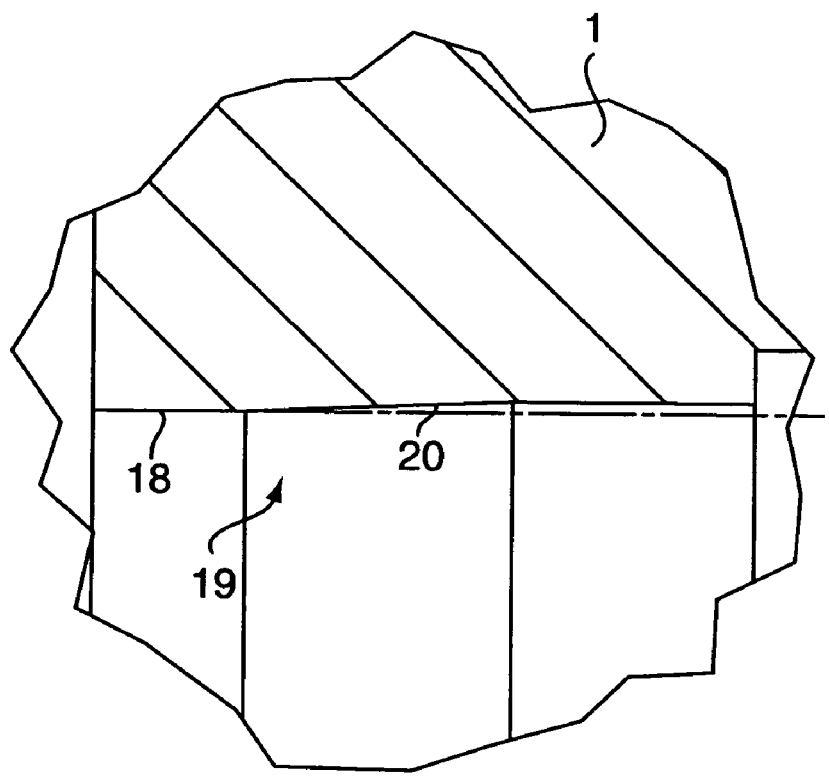
FIG. 7 is an enlarged view of an assembly surface of the body part in FIG. 6.

In FIG. 6, the body 1 is shown isolated from the sensor unit 4 and in FIG. 7, an enlarged view of the encircled part VII shows the assembling surface 19 of the body 1. The assembling surface 19 comprises a surface portion 20 having an inclination of 2.3 degrees to the surface portion 18. When the sensor unit 4 is arranged in the body 1, a wedge-shaped gap is formed between the surface portion 20 and an adjacent surface portion of the sensor unit 4.

The sensor unit 4 and body 1 of FIGS. 4 and 6 and the corresponding surface portions 20, 24 may be used in combination, or the sensor unit or the body may be combined with a component without any inclined surface portion.

Figure 8:
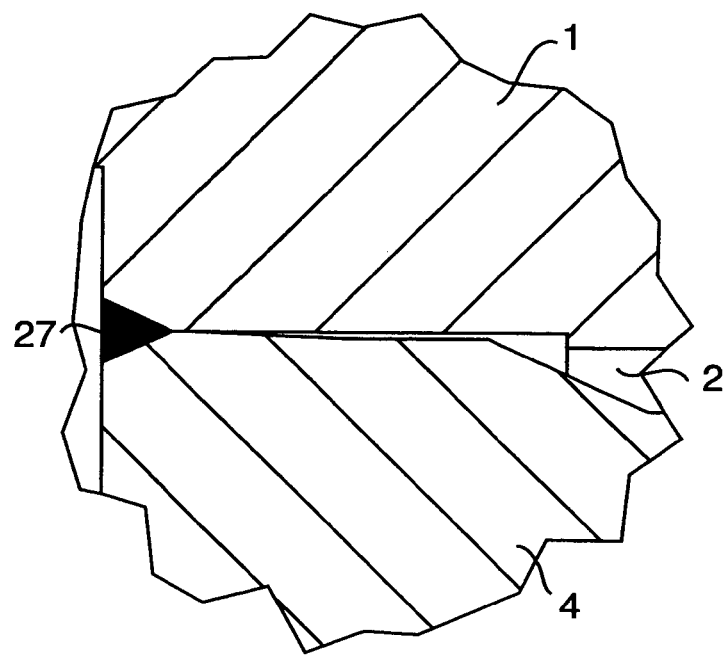
FIG. 8 is an enlarged view of the assembling zone during assembling by welding.
Figure 9:
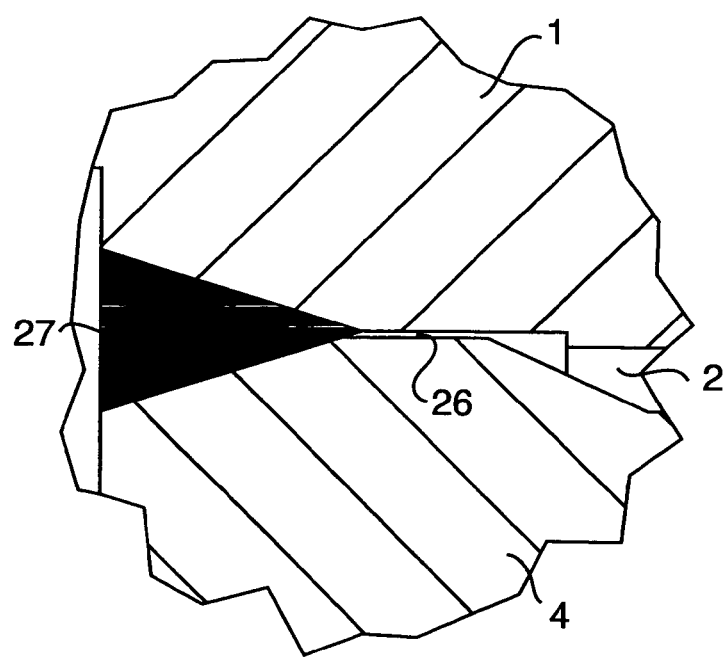
FIG. 9 is an enlarged view of the assembling zone during assembling by welding.

FIGS. 8–9 show enlarged views of the assembling zone during assembling by welding. In FIG. 8, the melt 27 has joined the surface contact zone of the assembling zone, and in FIG. 9, the melt has joined the transition zone of the assembling zone, and the gap 26 is adjacent the hermetic joint zone formed by the welding.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A pressure transmitter with a body part forming a cavity, and a pressure sensor unit arranged in the cavity, the body and the sensor unit forming in combination an assembling zone comprising a hermetic joint zone;

wherein the assembling zone further comprises a gap zone adjacent the hermetic joint zone in which gap zone the sensor unit and body are mutually dimensioned to form a gap between adjacent surfaces of the sensor unit and the body part.

2. The transmitter according to claim 1, wherein the sensor unit and body are mutually dimensioned to form a gap between adjacent surfaces in the hermetic joint zone when the sensor unit is arranged in the cavity prior to the hermetic joining.

3. The transmitter according to claim 1, wherein the assembling zone comprises a surface contact zone wherein the sensor unit and body are mutually dimensioned to form contact between adjacent surfaces when the sensor unit is arranged in the cavity prior to the hermetic joining.

4. The transmitter according to claim 3, wherein the assembling zone comprises a transition zone extending between the surface contact zone and the gap zone, and wherein the sensor unit and body are mutually dimensioned to form a wedge-shaped gap when the sensor unit is arranged in the cavity prior to the hermetic joining.

5. The transmitter according to claim 4, wherein the sensor unit is hermetically joined to the body part by welding, and wherein melt from the welding process joins the surface contact zone.

6. The transmitter according to claim 5, wherein melt from the welding process joins at least a part of the surface transition zone.

7. The transmitter according to claim 1, wherein adjacent surfaces of the sensor unit and body form an angle $\alpha$ to each other over a section of the assembling zone, wherein $0<\alpha<3$ degrees when the sensor unit is arranged in the cavity.

8. The transmitter according to claim 1, wherein the cavity is cylindrical and the sensor unit has the shape of a piston, and wherein the adjacent surfaces are constituted by the peripheral inner and outer surfaces of the cylinder and piston, respectively.

9. The transmitter according to claim 1, wherein the adjacent surface of at least one of the sensor unit and the body comprises at least two surface sections forming an angle $\alpha$ to each other, wherein $0<\alpha<3$ degrees prior to the hermetic joining.

10. The transmitter according to claim 1, wherein the cavity forms part of a conduit from a first end to be connected to an associated pressure system to an opposite second end housing the sensor, and wherein the adjacent surfaces of the body and sensor unit have circular shapes in a cross section perpendicular to the conduit when the sensor unit is arranged in the cavity prior to hermetic joining.

11. The transmitter according to claim 1, wherein the body forms a connection piece for connecting the transmitter to a pressure system.

12. A pressure sensor unit for a pressure transmitter, said sensor unit comprising:

a bottom portion;

a sidewall extending upwardly from the bottom portion towards an opening; and a flexible membrane sealing the opening;

wherein an outer surface of the sidewall forms an assembling surface which during a final assembling step is assembled with a corresponding assembling surface of an associated pressure transmitter body part, wherein the assembling surface comprises at least two non-parallel surface portions.

13. The pressure sensor unit for a pressure transmitter according to claim 12, wherein the pressure sensor unit is adapted to be received within a cavity of the associated pressure transmitter body part.

14. A body part for a pressure transmitter, said body part forming a cavity having an opening for receiving a pressure sensor unit, and in the cavity, an assembling surface which during a final assembling step is assembled with a corresponding assembling surface of an associated pressure sensor unit;

wherein the assembling surface comprises at least two non-parallel surface portions.

15. An assembly kit for making a pressure transmitter, said kit comprising:

a pressure sensor unit comprising a bottom portion and a sidewall extending upwardly towards an opening which is sealed with a flexible membrane, wherein an outer surface of the sidewall forms an assembling surface which during a final assembling step is assembled with a corresponding assembling surface of an associated pressure transmitter body part; and a body part forming a cavity having an opening for receiving the pressure sensor, and in the cavity, an assembly surface which during a final assembling step is assembled with the assembling surface of the sensor;

wherein the sensor unit and body are mutually dimensioned to form a gap between at least a part of the assembling surfaces when the sensor unit is arranged in the cavity for hermetic joining.

* * * * *